Dec. 7, 1943.  A. B. HASLACHER ET AL  2,336,449
HERMETICALLY SEALED BAG
Filed July 2, 1942  4 Sheets-Sheet 1

Inventors
Alfred B. Haslacher,
Howard A. Rohdin,
By
Attorney

Dec. 7, 1943.   A. B. HASLACHER ET AL   2,336,449
HERMETICALLY SEALED BAG
Filed July 2, 1942          4 Sheets-Sheet 2
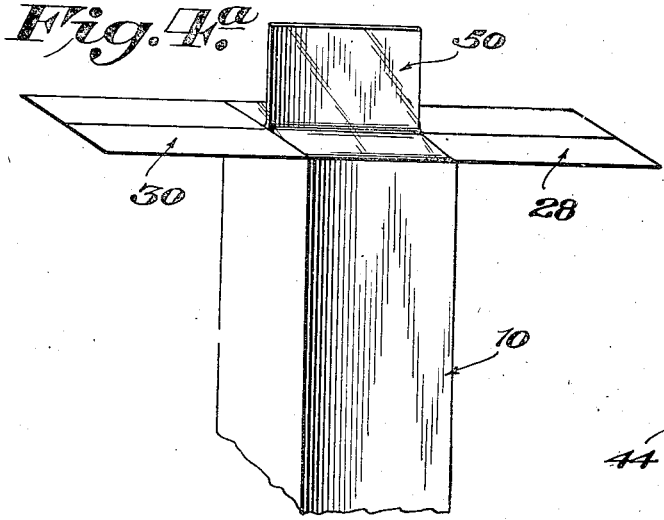
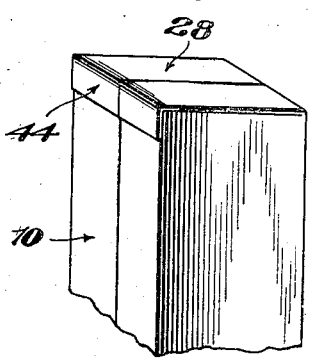
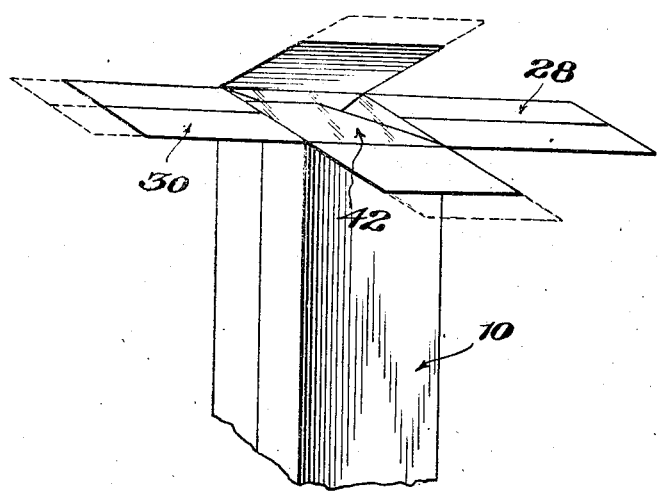
Inventors
Alfred B. Haslacher,
Howard A. Rohdin,
By Ross C. Hurley
Attorney

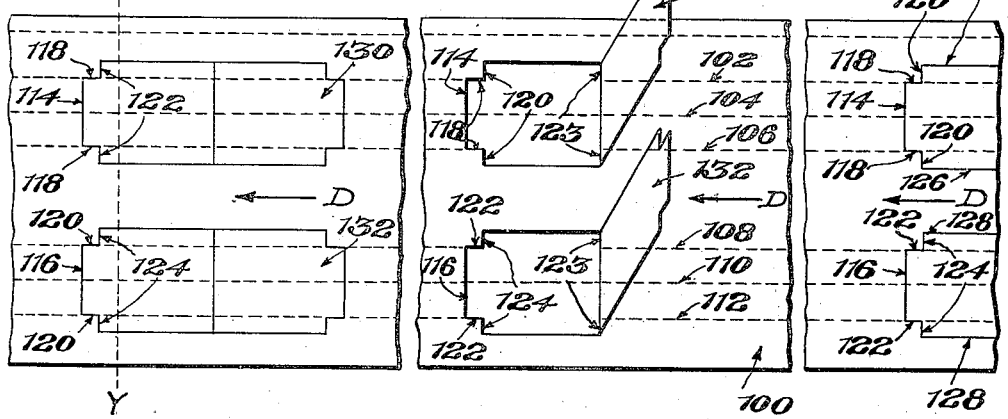
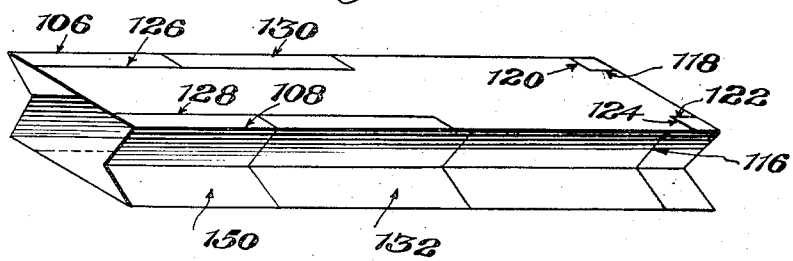
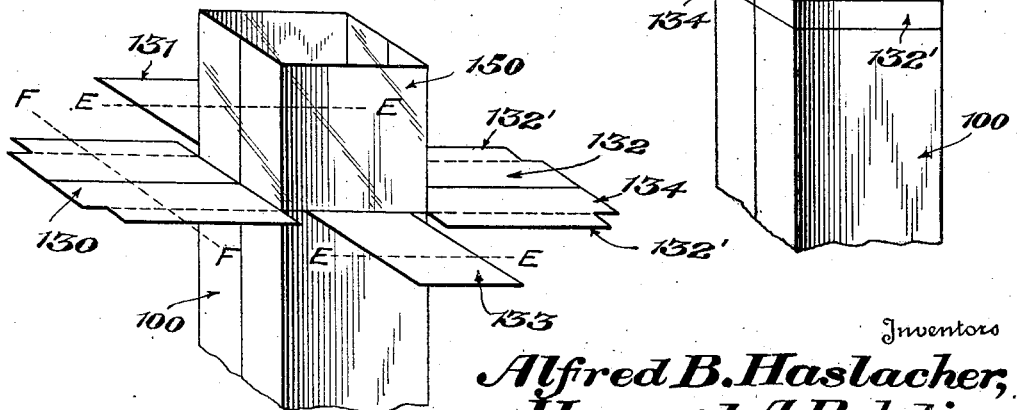

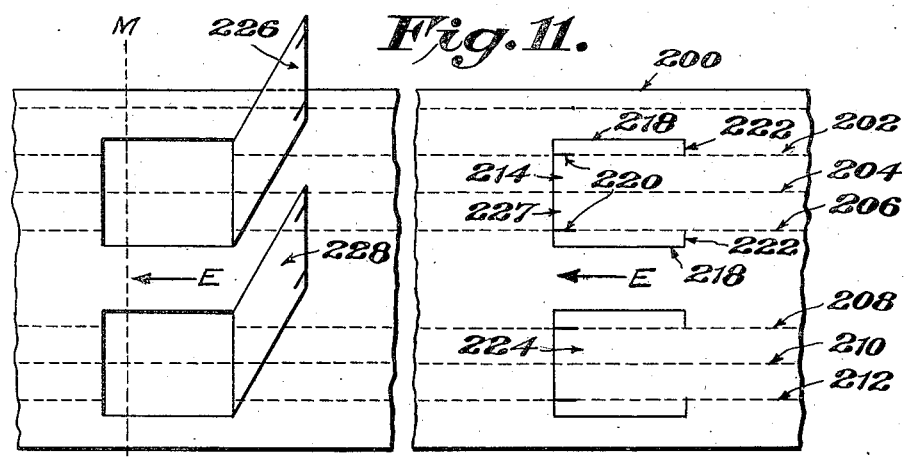
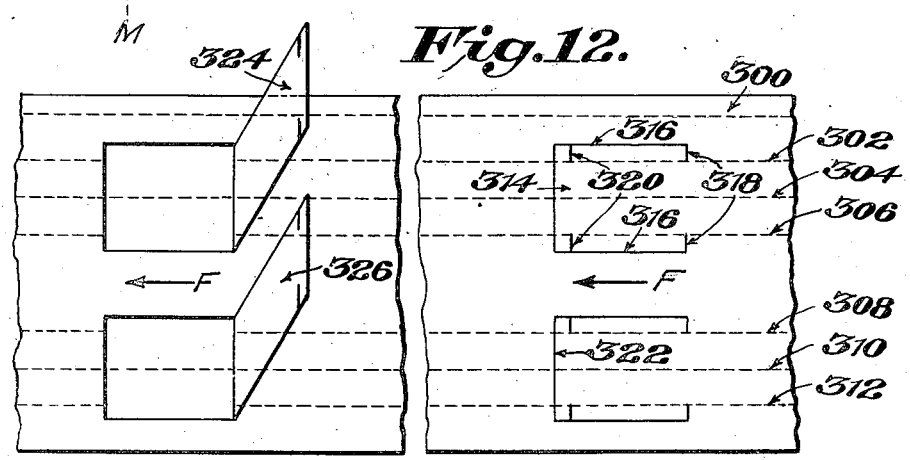
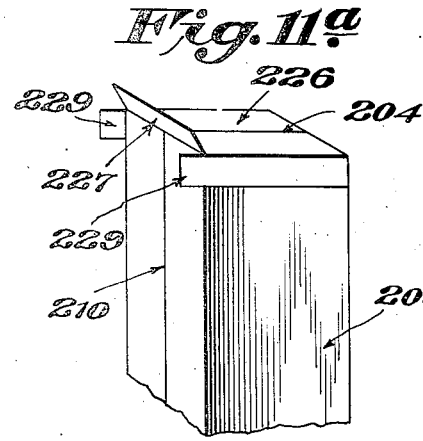
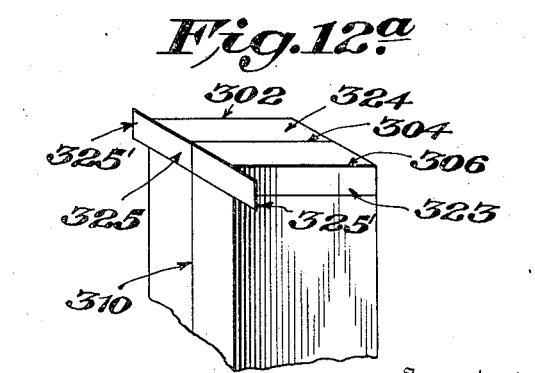

Patented Dec. 7, 1943

2,336,449

UNITED STATES PATENT OFFICE 2,336,449

HERMETICALLY SEALED BAG

Alfred B. Haslacher, New York, N. Y., and Howard A. Rohdin, Glen Ridge, N. J.

Application July 2, 1942, Serial No. 449,488

13 Claims. (Cl. 229—55)

Our invention relates to an improved bag of the type having an inner, heat-fusible ply and an independent outer ply of paper or other non-heat-fusible, flexible material and it is the object of this invention to provide a closure for a filled bag of this type which will permit heat sealing of the mouth of the heat-fusible ply in an optimum manner for any circumstances encountered and at the same time will yield a finished package of pleasing appearance, with the paper ply strengthening and supporting the heat-fusible ply.

These and other objects will be made clear from the following detailed description taken in connection with the annexed drawings in which.

Figure 1:
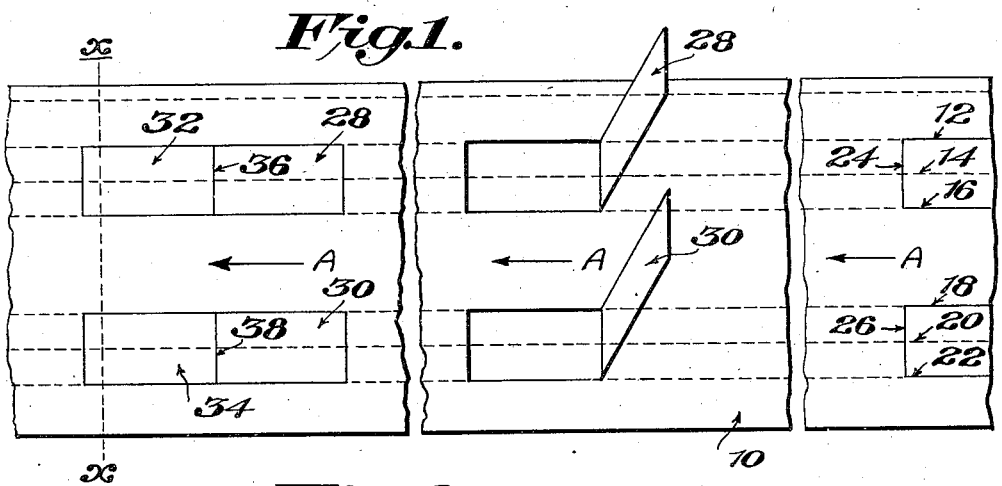
Fig. 1 illustrates the treatment of the paper web preparatory to assembling and tubing it with a web of heat-fusible material.
Figure 2:
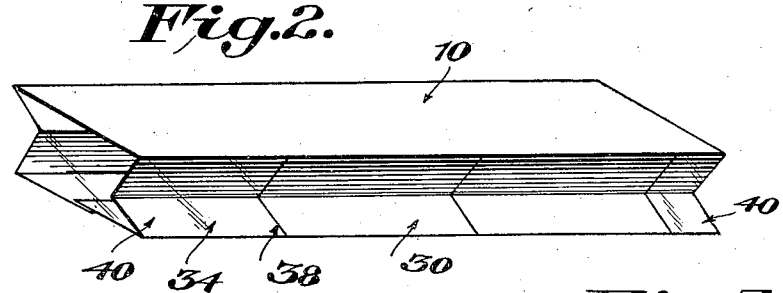
Fig. 2 is a view of the completed tube, the tube being shown as somewhat more expanded than is apt to be the case during the actual tubing operation.
Figure 4:
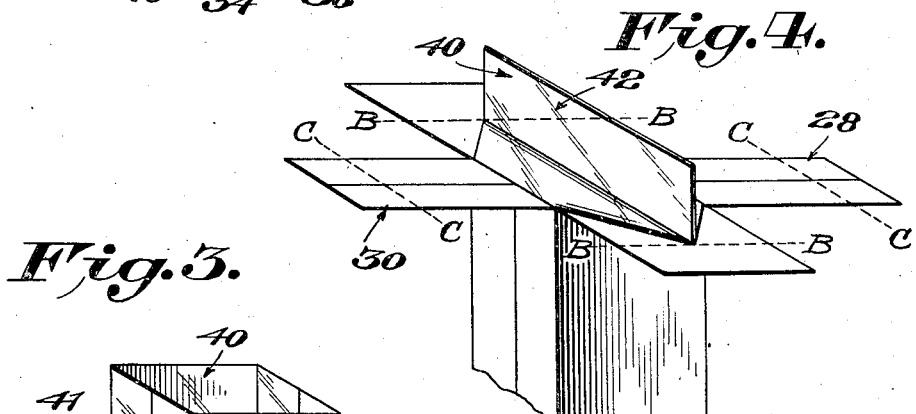
Fig. 4 is a view illustrating the first sealing step.

Fig. 4—A shows an alternative primary sealing step;

Fig. 5 is a view illustrating the disposal of the heat sealed liner mouth;

Fig. 6 is a perspective view of the completed package;

Fig. 7 is a view similar to Fig. 1 illustrating an alternative method of treating the paper web;

Fig. 8 is a view similar to Fig. 2 showing the effect on tube structure of the treatment illustrated in Fig. 7;

Fig. 9 is a view similar to Fig. 4 showing the disposition of the parts in the alternative form;

Fig. 10 is a view of the final package where the paper web has been treated in accordance with Fig. 7;

Fig. 11 is a view corresponding to Fig. 7 illustrating an alternative treatment of the web following the general principles of Fig. 7;

Fig. 11—A is a perspective view showing the effect of the treatment of Fig. 11 in the formation of the final closure;

Fig. 12 is a view similar to Fig. 7 showing still another alternative treatment of the web following the principles of Fig. 7; and Fig. 12—A is a perspective view showing how the treatment illustrated in Fig. 12 operates in the final package closure.

Much work has been done in the past ten years looking toward the production of a flexible walled collapsible package capable of being hermetically sealed. The problem is complex and involves a great many factors. In importance these factors divide more or less equally between technological and economic problems. If cost were no object there would be no technological difficulty in the way of producing perfect hermetically sealed packages. Similarly, if it were permissible to compromise with perfection of the hermetic character of the seal reasonably tight packages could be produced in quantities at reasonable cost. Extreme difficulty is encountered, however, when one attempts to produce a large number of perfect packages at a reasonable cost.

It cannot be too strongly emphasized that there is no problem in producing a single perfect package or even 1,000 perfect packages. In the packaging business production necessarily runs into millions of packages. No matter what expedient be resorted to, not all of these millions will be perfect. There is, however, for each size and type of package a fairly determinable maximum permissible proportion of defectives. Unless the proportion of defective packages be reduced at least to that point the project is a commercial failure and the commercial success of such a project is measured, from the profit standpoint of the manufacturer, by the extent to which the proportion of defectives is lowered below the maximum permissible proportion.

There is a real distinction between the problem of sealing the bottom of the bag in the course of manufacture and the problem of sealing the mouth of the bag, at the plant of the user after it has been filled. In general, the bag manufacturer uses better equipment, better supervision and better inspection than do most of the plants using the bags. Yet where hermetic sealing is required, it is immaterial at which end the failure takes place. The package is rated a failure or success depending on its performance in the hands of the user and his vendees. It is, therefore, necessary to differentiate sharply between the sealing facilities at the two ends of the package. The bottom should be arranged for the utmost facility and security in view of the equipment of the bag manufacturer, and the mouth end should be arranged to afford the user an opportunity for making the greatest possible proportion of perfect seals with his facilities, which may range anywhere from the most expensive automatic machinery to semi-automatic or even purely manual closing of the mouth end.

In the manufacture of bags the basic operation is the formation of a flattened tube. Once this is accomplished, bag lengths are severed from the tube and bottomed by any of several methods. In the tubing operation the paper or other flexible materials is continuously drawn from a roll and is flexed about an axis parallel to the length of the web until the edges of the web are brought into contact and secured. In Fig. 1 we illustrate a preliminary treatment given to a web of paper after it is drawn from the roll but before it has been flexed in the tuber. This web of paper will form the outer ply of our final package.

After it is given the treatment illustrated in Fig. 1 a web of heat-fusible material such, for example, as heat sealing "Cellophane," "Pliofilm," or a web of paper coated with thermoplastic material is superimposed on the paper web, being secured thereto, if at all, only by spots or lines of adhesive at particular points. The superimposed webs are then tubed.

As used throughout the specification and claims, the term "paper" includes all flexible, non-heat-fusible webs and the term "heat-fusible ply" includes all flexible webs capable of being heat-sealed, whether such webs be formed of heat-fusible material or merely coated therewith.

In Fig. 1 we show a web of paper 10 advancing in the direction of the arrows A. Lines 12, 14 and 16 indicate where one set of gusset fold lines will occur in the finished bag and lines 18, 20 and 22 indicate where the other set will occur. The first step in treating the web is to form a pair of slits 24 and 26 which are in alignment and extend transverse the length of the web 10. The slit 24 extends from line 12 to line 16 and the slit 26 extends from line 18 to line 22. The next step is to form longitudinal slits running from each end of each of the transverse slits. These longitudinal slits have a length which substantially exceeds the width of the front and rear walls of the finished bag, that is, the length of the longitudinal slits exceeds by a substantial amount the distance between lines 16 and 18. These longitudinal slits, together with the transverse slits, define tongues 28 and 30 which are pressed out of the plane of the web and folded back against the web to form openings 32 and 34. In Figure 1 the line X—X shows the point at which the cut off of the finished tube will occur. This line is spaced ahead of the fold lines 36 and 38 of the flaps 28 and 30, respectively, a distance at least equal to that between lines 16 and 18.

With the web in the condition illustrated at the left end of Fig. 1 the web 10 is superimposed upon a web of heat-fusible material and the superimposed webs are then tubed in a single operation and bag lengths are severed from the continuous composite tube.

Fig. 2 illustrates a bag length cut from the continuous tube formed as above described. The exterior is formed by the paper web 10. Flaps 28 and 30 are folded into the gussets and the openings 32 and 34 expose the heat-fusible ply 40 at the mouth of the bag and in the area of the gussets. At the opposite end of the bag, the portions of the openings 32 and 34 lying ahead of the cut off line X—X serve to expose portions of the heat-fusible ply 40 in the area of the gussets adjacent the end of the bag which is to be closed to form its bottom.

The precise form of bottom is immaterial so far as our improved mouth structure is concerned. Due to the exposure, however, of the heat-fusible ply at the bottom end it will frequently be convenient to form the bottom by a simple application of heat and pressure transverse the bag and in the area of the exposed heat-fusible ply. This will form a completely heat sealed fin which may be folded against and secured to either wall of the bag.

Figure 3:
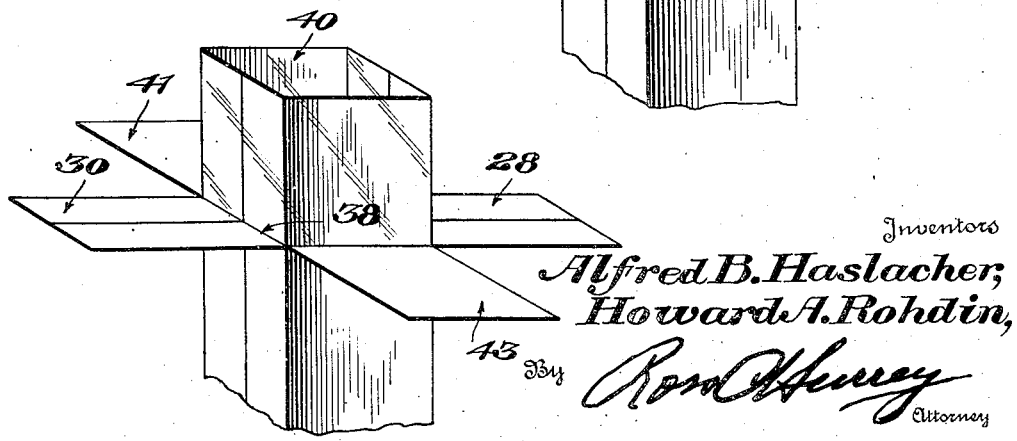
Fig. 3 is a perspective view of the open bag after it has been filled but before any of the sealing steps have been carried out.

In Fig. 3 we show the mouth of a filled bag. As illustrated here, flaps 28 and 30 have been brought up into a plane normal to the axis of the bag. For optimum results this should coincide as nearly as possible with the level of the contents. For reasons set forth hereinafter, however, our arrangement of flaps will produce an effectual and sightly package even though the level of the contents should lie substantially above this plane. It is to be understood that representation of the flaps as in this plane is for clarity of illustration and that in practice the flaps may, if desired, be bent below the plane. It is to be noted that the upper portions of the front and rear paper walls lying above the fold lines 36 and 38 respectively form flaps 41 and 43. These flaps 41 and 43 are pulled away from the heat-fusible ply 40 in the same manner as flaps 28 and 30, and leave the mouth of the heat-fusible ply completely accessible for the formation of any desired type of heat seal.

One such type is illustrated in Fig. 4 in which the mouth of the heat-fusible ply 40 has been drawn out and collapsed to form a fin 42 which may be subjected to heat and pressure to form a seal. The fin 42 may then be folded down into the plane occupied by flaps 41 and 43 and portions of the fin 42 which project beyond the cross section of the filled bag may be mutually superimposed so as to lie wholly within the cross section, as illustrated in Fig. 5. The closure is then completed by superimposing the various paper flaps.

In Fig. 4 the two lines B—B indicate the amount by which the flaps 41 and 43 exceed the length necessary to cover the cross section of the bag and the portions of these flaps lying outside the lines B—B may optionally be either folded out of the way or trimmed. The lines C—C similarly indicate the amount by which the flaps 28 and 30 exceed the width of the front and rear walls. It is to be noted that the flaps 28 and 30 are longer than the equivalent flaps formed of the front and rear walls, irrespective of the proportions of the bag. The excess length is, strictly speaking, essential on only one of these flaps. It is supplied on both flaps, however, to avoid any necessity for orienting the package in the filling and closing process.

Figs. 5 and 6 show the final closing steps when the fin type of seal is applied to the heat-fusible ply. The projecting portions of the front and rear walls, with the excess material either trimmed or folded out of the way, are mutually superimposed on the previously folded inner ply. These two portions may, if desired, be secured to each other by the application of ordinary adhesive. Flap 30 is then superimposed on the cross section of the bag, the excess length of flap 30 having been either trimmed or folded out of the way. This flap may, if desired, be adhered to the previously superimposed paper flaps. The flap 28 is then folded across the top of the bag and the excess material 44 is folded down against the opposite wall and adhered or otherwise secured thereto. This forms an exceptionally strong closure and gives complete support for the inner heat-fusible ply which, usually, is less strong than the outer paper ply.

In Fig. 4—A we have illustrated a different form of closure for the inner ply. In Fig. 4—A the gussets of the inner ply have been reformed to collapse the front and rear walls into a single plane and the paper of the front and rear walls has been permitted to follow the front and rear walls of the heat-fusible ply. This is advantageous for certain types of heat-fusible material which are sufficiently delicate so that the interposition of the paper of the front and rear walls between the source of heat and pressure is needed to protect the material of the inner ply. When, by means of heat and pressure, a seam has been formed across the upstanding portion 50 formed by the collapse of the bag mouth, the portion 50 is folded one or more times and brought into the plane of the contents of the bag. Flaps 28 and 30 are then mutually superimposed and the final package has precisely the external appearance illustrated in Fig. 6.

The importance of having sufficient material in the final closing flap to extend entirely across the top of the bag and down over one of the vertical walls depends on the application to the problem of merchandising of certain psychological principles. If the final closing flap should extend only partly across the top of the bag the package would be unsightly. When, however, the final flap forms a lip over the extremity of one vertical wall it is not unsightly and its appearance value is not altered by minor variations in the depth of the lip on the vertical wall caused by variations in the load line. These variations would be equally present if the flap extended partly across the top of the bag but in such case variations would contribute to unsightliness, since the gap between the end of the flap and the adjacent vertical wall will always appear to be due to faulty package design, whereas with the lip on the vertical wall the gap between the edge of the lip and the bottom of the bag clearly is intentional and minor variations in the depth of the lip do not affect the appearance. It is particularly to be noted that by bringing a closure flap entirely across the mouth of the bag there is produced a smooth surface completely devoid of projections and leaving an unbroken space for printing. This smooth top further contributes to the appearance of the packages as a matter of shelf display and clearly improves their stacking qualities. These effects all contribute very materially to the merchandising value of the package.

In Fig. 7 we show an alternative treatment of a paper web 100 preparatory to tubing. In this figure lines 102, 104 and 106 indicate the location of the gusset folds for one set of gussets, and lines 108, 110 and 112 indicate the opposite set of gusset folds. The web is continuously advanced in the direction of the arrows D. As a first step there is formed in the web a transverse slit 114 running between lines 102 and 106. Simultaneously a transverse slit 116, aligned with the slit 114, is formed running between lines 108 and 112. A pair of longitudinal slits 118 then are formed, lying on lines 102 and 106 and extending rearwardly from the ends of slit 114, while simultaneously another pair of longitudinal slits 120 is formed coincident with lines 108 and 112 and running rearwardly from the extremities of slit 116. The length of slits 118 and 120 is a matter of choice, within certain limits which will be made clear when the function of these slits is discussed hereinafter.

The next step is to form a short transverse slit 122 at the rearward end of each of the slits 118 and simultaneously to form similar transverse slits 124 at the rearward ends of the slit 120. The slits 122 are parallel to the slit 114 and extend beyond the ends of the slit 114 at each end thereof, and the transverse slits 124 have a similar relationship with the transverse slit 116.

The next step is to form longitudinal slits 126 running rearwardly from the outer extremities of the transverse slits 122 and simultaneously to form a similar pair of longitudinal slits 128 running rearwardly from the outer extremities of the transverse slits 124. The combination of transverse slits 114 with longitudinal slits 118, transverse slits 122 and longitudinal slits 126 is to define a flap or tongue 130, while a similar tongue 132 is formed by the other set of slits. These tongues are struck up out of the web as it advances and are folded back against the web, which is then superimposed upon a web of heat-fusible material and the two webs are then tubed together. At the base or fold line of each tongue slits 123 are formed parallel and equal to the transverse slits 122 and 124. Consecutive bag lengths are cut off along a line Y—Y which lies between the shoulder formed by slits 118 and 124 and the fold lines of tongues 130 and 132.

In Fig. 8 we show a completed bag length before the bottoming operation. For purposes of illustration the bag length is shown somewhat expanded, though it will be understood that in practice the bag length is completely flattened.

The turning back of the tongues 130 and 132 exposes, at the mouth end of the bag, a portion of the heat-fusible ply 150 and the area of exposure includes the full width of the gusset at the mouth end and a portion of the front and rear faces at the margins thereof. On the front face, which is visible in Fig. 8, these portions lie respectively between the slit 126 and the gusset fold line 106, and the slit 128 and the gusset fold line 108. At the bottom of the bag the inner ply 150 is exposed, through the area of the gussets, between the extremity of the bag and the transverse slits 114 and 116. There is also exposed the lower corners of the front and rear faces in the areas defined by slits 122 and 118 at one corner and 120 and 124 at the opposite corner. It is within the purview of our invention either to have the line of cut off Y—Y of Fig. 7 coincident with slits 122 and 124, in which case there will be no exposure of the inner ply on the front and rear walls at the bag bottom, or we may provide slits complementary respectively to slits 118 and 122 and slits 120 and 124 so as to remove as by a die-cutting operating the material forming the tabs outlined by slits 118 and 122 and slits 120 and 124. In this case the depth of the exposure of the front and rear faces of the inner ply at the front and rear walls at the bottom of the bag will be coextensive with the length of exposure of the inner ply in the gusseted walls. We prefer so to proportion the various slits that the line of cut off Y—Y may be made coincident with the short transverse slits and thus to avoid any exposure of the front and rear faces of the inner ply at the bottom of the bag. The die-cutting step may be desirable in order to simplify the problem of equal application of pressure to the formation of a heat sealed bottom of the filled type, although this will not usually be preferred due to the fact that die cutting, with removal of a completely enclosed piece of material, particularly of small dimensions, is somewhat difficult to accomplish at high web speeds. If the line of cut off Y—Y be made coincident with the slits 122 and 124, as stated, there will be no exposure of the inner ply of the front and rear walls at the bottom of the bag, and this may be advantageous in forming certain types of bottoms.

Fig. 9 corresponds generally with Fig. 3 and illustrates how the entire mouth of the heat-fusible ply 150 is exposed by the folding down of flaps 130 and 132 from the gusseted walls and flaps 131 and 133, which are formed of the material of the paper ply of the front and rear walls above the fold lines of the flaps 130 and 132. Lines E—E indicate the line of excess material in flaps 131 and 133, and line F—F indicates the excess material in flaps 130. The mouth of the inner ply 150 is given any desired form of heat-sealed closure such, for example, as illustrated in Figs. 4, 4A and 5. With the mouth of the ply 150 collapsed, sealed and folded so as to lie wholly within the cross section of the bag flaps 131 and 133 are folded thereover; flap 130 is then superimposed over flaps 131 and 133, and flap 132 is then brought over all of the other flaps and its lip 134 is folded against and secured to the opposite gusseted wall, while auxiliary flaps 132', consisting of the portions of paper removed from the front and rear walls, are folded against and secured to the front and rear walls, respectively. Because it is convenient in most cases not to be obliged to orient the bag to any particular position, flaps 130 and 132 have been shown as identical but clearly this is not essential so far as the production of a perfect package is concerned and either flap 130 or flap 132 could be made only as wide as the gusseted wall from which it is struck and would, therefore, be precisely equivalent to flaps 28 and 30 of Figs. 1 through 6.

In Fig. 11 we show a web 200 and indicate one set of gussets therein by lines 202, 204, and 206, while lines 208, 210 and 212 indicate the fold lines of the other set. The web 200 advances in the direction of the arrows E and during such advance, as a first step, a transverse slit 214 is formed across and extended slightly beyond lines 204 and 206. Longitudinal slits 218 are then formed extending rearwardly from the extremities of the slit 214, and an auxiliary pair of longitudinal slits 220 are formed extending rearwardly from the slit 214 and coincident with lines 202 and 206. Short transverse slits 222 are then formed at the rearward extremities of the slits 218 and extend inwardly from such extremities respectively to lines 202 and 206. The slits 218 exceed in length the width of the front and rear walls of the completed bag, that is, they exceed the distance between lines 206 and 208. The slits 220 in most cases will have a length equal only to the amount by which the length of slits 218 exceeds the width of the front and rear faces.

Simultaneously with the formation of the slits above described a similar set of slits, indicated generally by the numeral 224, is formed to overlie lines 208, 210 and 212 in the same manner as the above-described set of slits overlies lines 202, 204 and 206.

The next step is to turn back a tongue 226 defined by the first described set of slits and a tongue 228 defined by the second set of slits 224. The web 200 is then superimposed upon a web of heat-fusible material and the two webs are simultaneously tubed as heretofore described with reference to other forms.

In Fig. 11—A we show a package in which the paper web has been treated in accordance with Fig. 11 and have illustrated particularly the final closing step. The mouth of the heat-fusible ply has been sealed and folded into place and only flap 226 remains to be secured. This flap is drawn across the top of the bag. It is to be noted that the portion 227 of the flap 226 lying between the slits 220 forms a lip which may be bent over the vertical wall of the bag and the portions 229 of the flap 226 lying outside the slits 220 form tongues which may be folded either under or over the portion 227 and suitably secured thereto.

In Fig. 12 we show a paper web 300 advancing in the direction of the arrows F. On this web we have indicated the fold lines for one set of gussets by lines 302, 304 and 306, while lines 308, 310 and 312 indicate the other set. During the advance of the web 300 we first form a transverse slit 314 extending across and slightly beyond lines 302 and 306. We then form, running rearwardly from the extremities of slit 314, a pair of longitudinal slits 316. These slits are of a length substantially exceeding the width of the front and rear walls, that is, substantially exceeding the distance between lines 306 and 308. At the rearward extremities of lines 316 we form a pair of transverse slits 318 which run from the extremities of the slit 316 respectively to lines 302 and 306, and we also form, spaced rearwardly from slit 314, a pair of transverse slits 320 which are precisely similar to transverse slits 318. The transverse slits 320 are spaced from the transverse slit 314 a distance substantially equal the amount by which the length of slits 316 exceeds the width of the front and rear walls.

Simultaneously with the formation of the set of slits above described we form a similar set of slits indicated as 322 and bearing the same relationship to lines 308, 310 and 312 as the above described set of slits bears to lines 302, 304 and 306.

As the web 300 continues to advance a tongue 324 defined by the first described set of slits is struck out of the web and folded back against the web, while a tongue 326 defined by the set of slits 322 is similarly struck out. The web 300 is then superimposed upon a web of heat-fusible material and the superimposed webs are simultaneously tubed. In Fig. 12—A we illustrate the final step of closing a package formed from a web treated in accordance with Fig. 12. As a final step the tongue 324 has been drawn over the top of the package and its extremity 325, which has a width equal to the amount by which the length of flap 324 exceeds the width of the front and rear walls may be bent down and suitably secured to the vertical wall. Due to the formation of slits 320 there are provided lateral tongues 325' at each extremity of the flap 325 and these may be bent against the adjacent vertical walls so as to either overlie or underlie the lateral margins 323 of the flap 324 which are similarly folded against their adjacent vertical walls. As in the case of the short lateral flaps illustrated in Figs. 11—A and 12—A, the psychological principle above discussed with reference to Figs. 6, 6—A and 10 are fully complied with, even though these short flaps remain on the exterior of the package. The length of these flaps in reference to the width of the walls against which they are folded does not change with variations in the level of the contents and, therefore, a finished, uniform appearance will always be obtained. In general, however, a smoother appearance will be had if these short flaps are always bent under flaps extending the entire width of the face against which the short flaps are bent.

It is to be understood in connection with the treatment of the paper web illustrated in Figs. 1, 7, 11 and 12 that it is entirely optional either to carry out the illustrated treatment as part of the bag making operation, or, where pre-printing is done, to carry out the special treatment as a part of the printing operation, in which case the treated and printed web will be rewound before being taken to the bag machine.

In connection with all of the various forms illustrated it is to be noted that the flaps formed from the material of the gusseted walls are so related to the line of cut off that the total length of each flap exceeds the width of the front and rear walls so as to permit complete coverage of the upper end of the bag. It is also clear that, due to the fact that the line of cut off X—X in Fig. 1 and Y—Y in Fig. 7 lie intermediate the extremities of the opening formed by the turning back of the tongues, the tongues will always exceed in length the adjacent portions of the front and rear walls, both of the paper ply and of the heat-fusible ply. The advantage of this has been previously discussed in connection with the appearance of the bag. There is, however, a further advantage attained by our method of striking tongues from the web before the tubing operation. As a rule the material of the heat-fusible ply is far more expensive than the paper forming the outer ply. By our method and the design of our package we secure an additional length of paper where it is needed at the mouth of the bag without being obliged to sacrifice an equivalent amount of the expensive heat-fusible material.

The limiting factors on the length of slits 118 and 122 are based, first, on the requirements of appearance in the finished package and, second, on the requirement for paper in forming the bag bottom. This latter factor depends on the type of bottom to be formed and selection of precise dimensions in any particular case is a matter for the skill and experience of the bag manufacturer.

While we have emphasized the sealing of the mouth of the inner ply by taking advantage of its inherent heat-fusible characteristics, it is entirely possible for some purposes to close the mouth by the application of a suitable type of adhesive tape. In addition, while we have for the most part emphasized that the inner ply is not secured to the outer ply, such securement may be desirable for some purposes as, for example, the two plies may be secured together around the line of the intended level of the contents and for the formation of certain types of closures it may be desirable to secure the paper ply to the heat-fusible ply adjacent the upper extremities of the front and rear walls of the paper ply. This would be particularly desirable in connection with the formation of a closure as illustrated in Fig. 4—A.

Although we have described our process as involving a particular sequence of steps, the sequence is not essential to our inventive concept and all of the steps incident to the treatment of the web could be carried out simultaneously without departure from our inventive concept. In practice, however, it is probable that the sequence as set forth herein will be found the most advantageous so far as machine operations are concerned.

It is to be understood that our invention is not to be limited by the structural details disclosed in this specification but only as set forth in the sub-joined claims which are to be broadly construed.

What is claimed is:

1. A bag comprising a flattened tube of flexible material having front and rear walls, gusseted side walls and a closure at one end; said tube comprising an outer ply of paper and an independent inner ply of heat-fusible material; the paper ply, at the open end, being slit at the edges of the front and rear walls downwardly from the mouth of the bag for a distance substantially exceeding the width of the front and rear walls and to a point approximating the intended load line of the bag when filled, said paper ply being secured to said heat-fusible ply only at the front and rear walls adjacent the extremity of the paper ply.

2. A bag comprising a flattened tube of flexible material having front and rear walls, gusseted side walls and a closure at one end; said tube comprising an outer ply of paper and an independent inner ply of heat-fusible material; the paper ply at the open end being slit at the edges of the front and rear walls downwardly from the mouth of the bag for a distance substantially exceeding the width of the front and rear walls and to a point approximating the intended load line of the bag when filled; the paper ply forming the gussets being longer at the mouth of the bag than the corresponding portion of the heat-fusible ply.

3. A bag formed from a flattened tube of flexible material having front and rear walls, gusseted side walls, and a closure at one end; said tube being formed of an outer ply of paper and an independent inner ply of heat-fusible material; the paper ply at the open end of said tube being slit along lines parallel to the gusset fold lines and extending downwardly from the mouth of the bag a distance substantially exceeding the width of the front and rear walls and approximately to the intended load line of the bag when filled.

4. A bag formed from a flattened tube of flexible material having front and rear walls, gusseted side walls and a closure at one end; said tube being formed of an outer ply of paper and an independent inner ply of heat-fusible material; the paper ply at the open end of said tube being slit along lines parallel to the gusset fold lines and extending downwardly from the mouth of the bag a distance substantially exceeding the width of the front and rear walls and approximately to the intended load line of the bag when filled, one pair of said slits being spaced inwardly from the margins of adjacent edges of the front and rear walls.

5. A bag formed from a flattened tube of flexible material having front and rear walls, gusseted side walls and a closure at one end; said tube being formed of an outer ply of paper and an independent inner ply of heat-fusible material; the paper ply at the open end of said tube being slit along lines parallel to the gusset fold lines and extending downwardly from the mouth of the bag a distance substantially exceeding the width of the front and rear walls and approximately to the intended load line of the bag when filled, one pair of said slits being spaced inwardly from the margins of adjacent edges of the front and rear walls, said paper ply being secured to said heat-fusible ply only at said closure and adjacent the mouth of the bag on said front and rear walls.

6. A bag formed from a flattened tube of flexible material having front and rear walls, gusseted side walls and a closure at one end; said tube being formed of an outer ply of paper and an independent inner ply of heat-fusible material; the paper ply at the open end of said tube being slit along lines parallel to the gusset fold lines and extending downwardly from the mouth of the bag a distance substantially exceeding the width of the front and rear walls and appropriately to the intended load line of the bag when filled; one pair of said slits being spaced inwardly from adjacent margins of the front and rear walls and said paper ply in the area of the gussets being substantially longer than the corresponding portion of said heat-fusible ply.

7. A bag formed from a flattened tube of flexible material having front and rear walls, gusseted side walls and a closure at one end; said tube being formed of an outer ply of paper and an independent inner ply of heat-fusible material; the paper ply at the open end of said tube being slit along lines parallel to the gusset fold lines and extending downwardly from the mouth of the bag a distance substantially exceeding the width of the front and rear walls and approximately to the intended load line of the bag when filled, said slits being spaced inwardly from the margins of the front and rear walls, said paper ply in the area of the gussets being substantially longer than the corresponding portion of said heat-fusible ply, that portion of the paper ply in the area of the gussets and coextensive with said slits being folded back against the adjacent portion of the paper ply.

8. A tubular blank for formation into a bag comprising an inner ply of heat-fusible material and an independent outer ply of paper, said plies being formed into a tube having front and rear walls and gusseted side walls, the paper ply in the area of the gussets being longer than the heat-fusible ply at one end of the blank and being correspondingly shorter than said heat-fusible ply at the opposite end of the blank.

9. A bag comprising an inner ply of heat-fusible material and an independent outer ply of paper, said plies being formed into a tube having front and rear walls and gusseted side walls, the paper ply in the area of the gussets being, at the mouth end of the bag, longer than said heat-fusible ply and at the opposite end of the bag correspondingly shorter than said heat-fusible ply; the bag at said last named end being closed by a heat sealed seam to form a fin and said fin being folded against and secured to one wall of the bag.

10. A bag comprising an inner ply of heat-fusible material and an independent outer ply of paper, said plies being formed into a tube having front and rear walls and gusseted side walls, the paper ply in the area of the gussets being, at the mouth end of the bag, longer than the said heat-fusible ply and at the opposite end of the bag correspondingly shorter than the said heat-fusible ply, the bag at said last named end being closed by a heat sealed seam to form a fin and said fin being folded against and secured to one wall of the bag, the portions of the paper ply in the area of the gussets at the mouth end being folded back against the adjacent portions of the paper ply along lines parallel with the intended load line of the bag when filled.

11. A bag comprising a flattened tube having front and rear walls and gusseted side walls and being formed of an outer ply of paper and an independent inner ply of heat-fusible material; said paper ply being slit to form tongues adjacent the mouth of the bag, the tongues overlying the gussets being folded back upon the adjacent portion of said paper ply; said tongues being longer than the remaining paper between slits.

12. A bag comprising a flattened tube having front and rear walls and gusseted side walls and being formed of an outer ply of paper and an independent inner ply of heat-fusible material; said paper ply being slit to form tongues adjacent the mouth of the bag, the tongues overlying the gussets being folded back upon the adjacent portion of said paper ply; said tongues being longer than the remaining paper between slits, at least one of said tongues exceeding its adjacent gusset in width.

13. A bag comprising a flattened tube having front and rear walls and gusseted side walls and being formed of an outer ply of paper and an independent inner ply of heat-fusible material; said paper ply being slit to form tongues adjacent the mouth of the bag, the tongues overlying the gussets being folded back upon the adjacent portion of said paper ply; said tongues being longer than the remaining paper between slits, at least one of said tongues exceeding its adjacent gusset in width for a length equal to the width of the front and rear walls and being equal in width to said gusset for a short distance at its free end.

ALFRED B. HASLACHER.
HOWARD A. ROHDIN.